(12) United States Patent
Sandelis

(10) Patent No.: US 8,181,440 B2
(45) Date of Patent: May 22, 2012

(54) ARRANGEMENT OF A SEMICONDUCTOR-TYPE IGNITER PLUG IN A GAS TURBINE ENGINE COMBUSTION CHAMBER

(75) Inventor: Denis Jean Maurice Sandelis, Nangis (FR)

(73) Assignee: SNECMA, Paris (FR)

( * ) Notice: Subject to any disclaimer, the term of this patent is extended or adjusted under 35 U.S.C. 154(b) by 657 days.

(21) Appl. No.: 12/353,453

(22) Filed: Jan. 14, 2009

(65) Prior Publication Data
US 2009/0178385 A1 Jul. 16, 2009

(30) Foreign Application Priority Data

Jan. 15, 2008 (FR) ..................... 08 00210

(51) Int. Cl.
*F02C 7/264* (2006.01)
(52) U.S. Cl. ............... 60/39.821; 60/39.826; 60/39.827; 60/752
(58) Field of Classification Search ............... 60/39.821, 60/752, 39.826, 39.827
See application file for complete search history.

(56) References Cited

U.S. PATENT DOCUMENTS

| 3,048,015 | A | | 8/1962 | Barrelle et al. |
| 3,990,834 | A | | 11/1976 | DuBell et al. |
| 4,007,391 | A | | 2/1977 | Baker |
| 5,565,118 | A | * | 10/1996 | Asquith et al. ........... 219/121.57 |
| 5,852,340 | A | * | 12/1998 | Ito et al. ......................... 313/141 |
| 7,216,488 | B2 | * | 5/2007 | Howell et al. ................... 60/776 |
| 7,546,739 | B2 | * | 6/2009 | Holland et al. ................. 60/772 |

FOREIGN PATENT DOCUMENTS

| DE | 19 00 035 | | 8/1969 |
| EP | 1 619 369 | A2 | 1/2006 |
| FR | 2 244 083 | | 4/1975 |
| FR | 2 290 062 | | 5/1976 |

* cited by examiner

*Primary Examiner* — Ehud Gartenberg
*Assistant Examiner* — Nicholas Karnezos
(74) *Attorney, Agent, or Firm* — Oblon, Spivak, McClelland, Maier & Neustadt, L.L.P.

(57) ABSTRACT

An igniter plug arrangement is disclosed. The arrangement includes an igniter plug of the semiconductor in shell type, a duct secured to a combustion chamber of a gas turbine engine, a floating sleeve via which the igniter plug is mounted in the duct, and a system for guiding air to cool the semiconductor of the igniter plug. The shell and the semiconductor define, at their combustion-chamber end, an annular igniter plug cavity. The shell includes orifices in the region of the igniter plug annular cavity that communicate with the annular cavity of the sleeve and orifices on its planar surface.

8 Claims, 3 Drawing Sheets

ARRANGEMENT OF A SEMICONDUCTOR-TYPE IGNITER PLUG IN A GAS TURBINE ENGINE COMBUSTION CHAMBER

BACKGROUND OF THE INVENTION AND DESCRIPTION OF THE PRIOR ART

The present invention relates to the field of gas turbine engines and is concerned more specifically with the arrangement of a semiconductor-type igniter plug mounted in a combustion chamber.

In a gas turbine engine, the combustion chamber receives air from the compressor, some of which air is mixed with the fuel which is burnt in the primary combustion zone. Ignition is brought about by one or two igniter plugs positioned downstream of the carburetion system. Another part of the air bypasses the primary combustion zone and mixes with the combustion gases. All of the hot gases are directed toward the turbine. The combustion chambers are designed to meet a certain number of essential specifications such as: in-flight reignition, the shape of the temperature profile, the emissions of pollutant gases and both thermal and mechanical integrity of the various components thereof.

In particular, the ignition system must be capable of in-flight reignition if the combustion chamber is accidently extinguished while at the same time being able to tolerate and withstand the thermal stresses applied to it. These two conditions dictate arrangements that are difficult to reconcile. Specifically, the injection system produces a sheet of atomized fuel at a certain angle. If this angle is very tight, the igniter plug is outside of the cone formed by the fuel, which is favorable in terms of thermal integrity but reduces the ease of ignition within the chamber. Conversely, an injection system in which the sheet of fuel forms a very wide cone angle considerably heats up the chamber zone surrounding the igniter plug because of fuel impinging on the walls and the igniter plug. This has an adverse effect on the thermal integrity of these components.

The present invention is concerned with ignition systems in which the igniter plug is mounted on the chamber via a component that acts as an adapter itself attached to the casing of the chamber. The igniter plug extends from the casing radially toward the inside of the chamber and its end lies flux with the wall of the chamber through an opening formed therein and that forms a duct. A minimal lateral clearance is left around the igniter plug in order to allow relative movement between the chamber and the casing as a result of temperature variations during the various phases of flight without the igniter plug, which is secured to the casing, butting or pressing against the edges of the opening in the wall of the chamber. The opening in the wall of the chamber forms a duct into which the igniter plug is slipped and a floating sleeve surrounding the igniter plug provides sealing between the chamber and the space between the chamber and the casing. An example of this way of mounting an igniter plug in a combustion chamber using an adapter is disclosed in patent application EP 1.443.190.

It may be noted that there are two types of igniter plug used in gas turbine engine combustion chambers:

Igniter plugs of the "high energy/high voltage" type, the operating voltage of which is of the order of 20 kV, and igniter plugs of the "high energy/low voltage" type, the operating voltage of which is of the order of 2 to 3 kV. Igniter plugs of the "high energy/low voltage" type have a semiconductor material between their electrodes, such that if sufficient voltage is applied between the electrodes, a spark is created. The life of the igniter plugs is limited; in the case of "high energy/high voltage" igniter plugs, this is limited by electrode wear and in the case of "high energy/low voltage" igniter plugs, life is limited by semiconductor wear, the semiconductor becoming worn away more rapidly than the electrodes.

The advantages of "high energy/low voltage" igniter plugs are, on the one hand, associated with the fact that their operation is not very dependent on combustion chamber conditions and, on the other hand, associated with the more compact ignition chain that need be installed in order to operate them.

After repeated ignition sequences, the igniter plug semiconductor experiences significant thermal stresses. The impingement of fuel on the semiconductor, together with the electric arc cause damage to this semiconductor, altering its shape.

SUMMARY OF THE INVENTION

It is an object of the present invention to improve the longevity of semiconductor-type igniter plugs by proposing a new igniter plug arrangement that allows the semiconductor to be cooled while at the same time limiting the impingement of fuel thereon.

It is an object of the invention to review the shape of the floating sleeve of the ignition system and to modify the igniter plug shell in order to cool the semiconductor while at the same time limiting the impingement of fuel thereon. The invention allows the thermal stresses on the semiconductor to be limited, thus improving semiconductor longevity.

The invention relates to an arrangement comprising an igniter plug of the semiconductor type in a shell, a duct secured to a combustion chamber of a gas turbine engine, a floating sleeve via which the igniter plug is mounted in the duct, in order to accommodate expansion along an axis perpendicular to the axis of the igniter plug. It is characterized in that it comprises means for guiding air to cool the semiconductor of the igniter plug, the shell and the semiconductor defining, at their combustion-chamber end, an annular igniter plug cavity, and the shell comprising orifices in the region of the igniter plug annular cavity that communicate with the annular cavity of the sleeve and orifices on its planar surface.

According to another feature of the invention, the floating sleeve comprises a cylindrical part which, with the igniter plug, forms an annular sleeve cavity in which cooling air can circulate.

The sleeve more particularly comprises an upper disk that forms a flange collaborating with a slideway formed in the duct.

The present application also relates to a combustion chamber of a gas turbine engine comprising at least one igniter plug mounted as set out hereinabove.

The present application further relates to a gas turbine engine comprising at least one igniter plug mounted as set out hereinabove.

BRIEF DESCRIPTION OF THE DRAWING

The invention is now described in greater detail with reference to the attached drawings in which.

DESCRIPTION OF THE PREFERRED EMBODIMENT(S)

Figure 1:
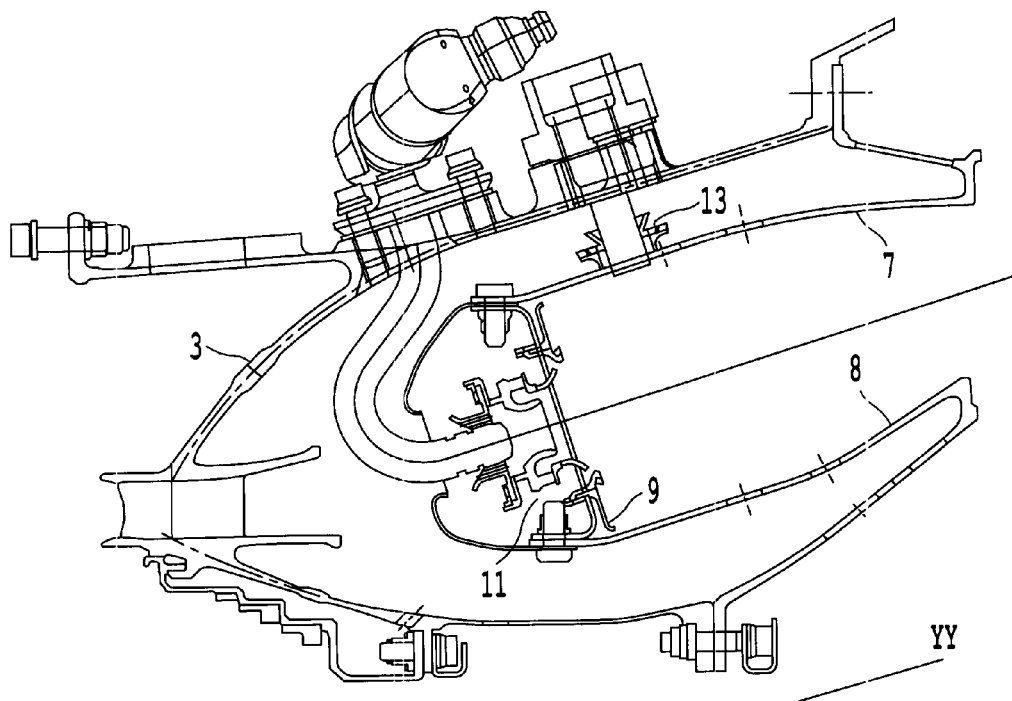
FIG. 1 shows, in longitudinal section, part of a gas turbine engine combustion chamber.

As may be seen in FIG. 1, the combustion chamber 1 is contained in an annular space formed by an external casing 3. It comprises one or more outer shell rings 7 with flanges or supports, one or more internal shell rings 8 with flanges, a chamber end wall 9 associated with upstream fairings. A plurality of fuel injection pipes, distributed about the axis of the engine, opens into the chamber end wall 9. Deflectors 11 form a bowl around each supply pipe, deflect some of the air that has entered the faired zone in a radial and swirling direction toward the atomized fuel, and thus create a mixture of fuel with air. A primary combustion zone is formed downstream of the chamber end wall and it is here that the mixture is ignited by one or more circumferentially distributed igniter plug(s) 13.

Figure 2:
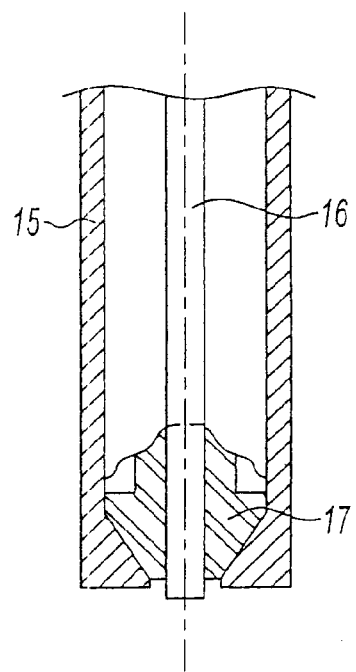
FIG. 2 shows a semiconductor-type igniter plug of the prior art, viewed in longitudinal section.

FIG. 2 is a schematic diagram of the basic design of a semiconductor-type igniter plug. This is made up of a tubular metal body that constitutes the shell or external electrode 15 of the igniter plug and of a central electrode 16. Electrical insulation of the central electrode is afforded by a sleeve tube inserted between the shell 15 and the central electrode 16 and not depicted in the figure. At the end of the igniter plug there is the ceramic semiconductor 17 which connects the ends of the central electrode 16 and of the shell 15. The internal wall of the shell 15 is conical at its lower end so as best to follow the shape of the semiconductor, whereas its external wall forms a flat surface perpendicular to the axis of the igniter plug. The shell thus formed holds the semiconductor in place and prevents it from entering the combustion chamber.

Figure 3:
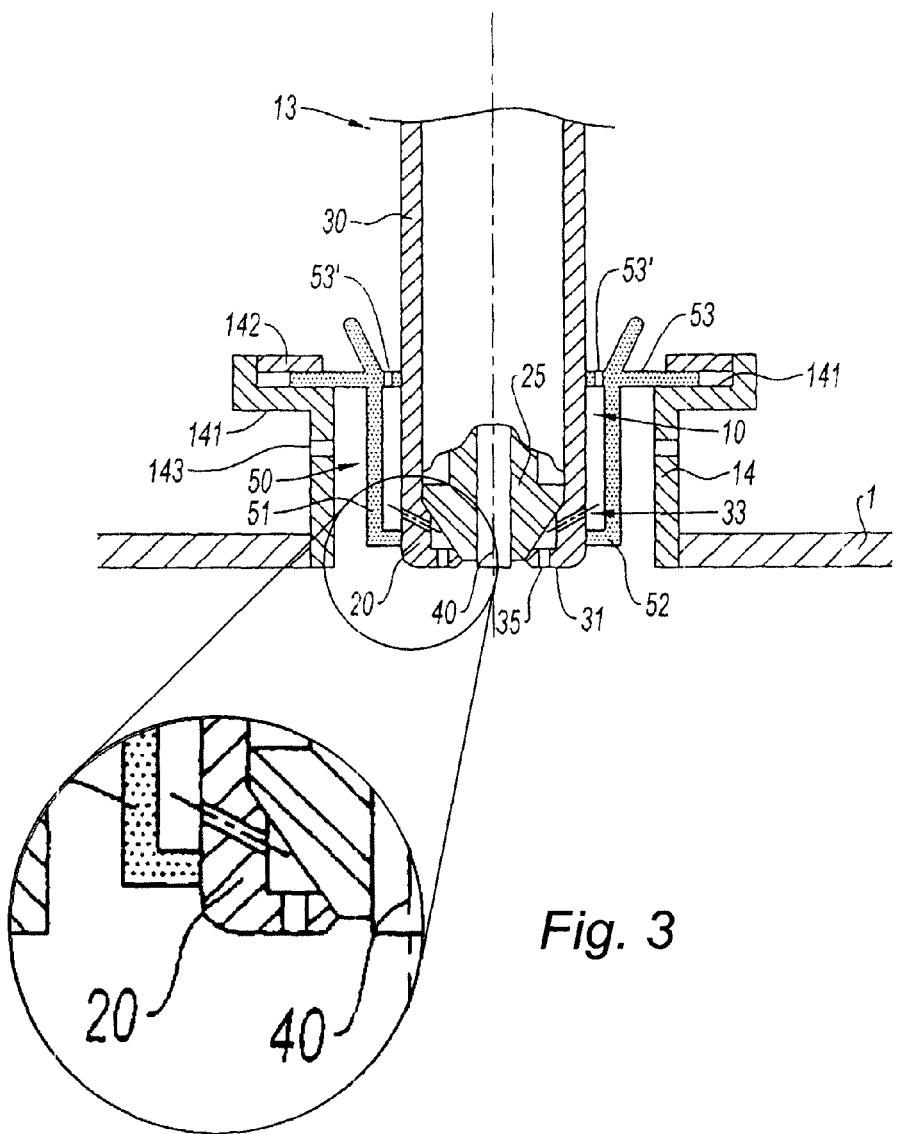
FIG. 3 shows the arrangement of the igniter plug according to the invention, viewed in longitudinal section.

As depicted in FIG. 3, an igniter plug 13 of the semiconductor type according to the present invention consists of a tubular body constituting the shell 30, and of a central electrode 40 with the same axis of symmetry as the shell 30. The materials of the shell 30 and of the central electrode 40 are chosen to be a conducting material such as a nickel-chrome steel alloy. The igniter plug 13 is guided in a duct 14. The duct 14 has been attached to an opening formed in the combustion chamber 1. Said duct 14 is of cylindrical shape and at its upper part has a flat surface 141 that forms a slideway against which the flange 51 of a sleeve 50 bears. A component 142 in the form of a washer clamps said sleeve onto the duct 14.

Depicted in a cutaway view at the end of the igniter plug 13 is the semiconductor 25 situated between the shell 30 and the central electrode 40. At its lower end, the shell 30 forms a flat surface 31 perpendicular to the axis of the igniter plug. The semiconductor 25 of the igniter plug is inserted between this flat surface 31 and the central electrode 40. The end of the semiconductor 25 and the internal wall of the shell 30 define an igniter plug annular cavity 20.

The floating sleeve 50 comprises a part of cylindrical shape, of a diameter greater than that of the shell 30, with, at its two ends, two disks encircling the igniter plug 13. The internal wall of the sleeve 50 and the shell 30 define a sleeve annular cavity 10. The lower disk 52 closes the sleeve cavity 10. The upper disk of the sleeve 50 is of a greater diameter and forms a flange 53 that fits into the slideway 141-142 of the duct 14. The upper part of the sleeve 50, above the flange 53, is of a divergent shape so as to direct air, outside the combustion chamber, toward orifices 53' pierced through this flange, above the annular cavity 10. The air therefore flows through the annular cavity 10 toward orifices 33 pierced in the lower part of the shell 30 on the wall parallel to the axis of the igniter plug 13. These orifices 33 are inclined and open into the annular cavity 20. The air present in the annular cavity 10 passes through the orifices 33 and enters the annular cavity 20, thus impinging on the semiconductor 25 and cooling it.

Discharge orifices 35 are pierced, parallel to the axis of the igniter plug, on the flat surface 31 of the shell 30. They also prevent any fuel from settling on the semiconductor.

Ventilation orifices 143 are pierced, at right angles to the axis of the igniter plug, on the lower part of the duct 14. Air from the space outside the combustion chamber contributes toward cooling this zone of the combustion chamber.

Thus, air from outside the combustion chamber, can, via the orifices 53', enter the annular cavity 10 formed by the arrangement of the sleeve 50. The air then passes through the orifices 33 in the shell 30 into the annular cavity 20 to impinge on the semiconductor of the igniter plug in order to cool it. To prevent fuel from settling on the semiconductor, orifices 35 are created in the lower part of the shell 30, allowing the air to reemerge.

According to this embodiment, the orifices 33 are inclined toward the shell of the igniter plug and the orifices 35 are parallel to the axis of the igniter plug. These orifice shapes are nonlimiting and so, in other embodiments that have not been depicted in the figures, the orifices 33 may be at right angles to the axis of the igniter plug, and the orifices 35 are inclined and divergent so as not to impede the electric arc created between the central electrode and the shell.

The invention claimed is:

1. An igniter plug arrangement for a gas turbine engine comprising:
    an igniter plug including a semiconductor disposed in a shell, a lower end of the semiconductor including a first outer circumferential surface, a second outer circumferential surface, and a frustoconical surface connecting the first and the second outer circumferential surfaces, and a lower end of the shell presenting a first inner circumferential surface, a second inner circumferential surface, a frustoconical surface connecting the first and the second inner circumferential surfaces, and a flat end surface perpendicular to an axis of the igniter plug;
    a duct secured to a combustion chamber of the gas turbine engine; and
    a floating sleeve via which the igniter plug is mounted in the duct, the floating sleeve including a first upper disk, a second lower disk, and a cylindrical part connecting the first upper and second lower disks, and an internal wall of the floating sleeve and an external surface of the shell defining an annular cavity of the floating sleeve,
    wherein the first outer circumferential surface of the semiconductor abuts the first inner circumferential surface of the shell, and a first portion of the frustoconical surface of the semiconductor abuts the frustoconical surface of the shell,
    wherein a second portion of the frustoconical surface of the semiconductor, the second inner circumferential surface of the shell, and the flat end surface of the shell define an annular igniter plug cavity, and
    wherein a first set of orifices are provided in the lower end of the shell such that the annular igniter plug cavity is in communication with the annular cavity of the floating sleeve and a second set of orifices are provided in the flat end surface of the shell.

2. The igniter plug arrangement as claimed in claim 1, wherein the first upper disk presents a flange collaborating with a slideway formed in the duct.

3. A combustion chamber comprising at least one igniter plug mounted as claimed in claim 1.

4. A gas turbine engine comprising a combustion chamber equipped with at least one igniter plug mounted as claimed in claim 1.

5. The igniter plug arrangement as claimed in claim 1, wherein a discharge orifice is provided in the flat end surface of the shell, an axis of the discharge orifice being parallel to the axis of the igniter plug.

6. The igniter plug arrangement as claimed in claim 5, wherein a third portion of the frustoconical surface of the semiconductor abuts an edge of the discharge orifice.

7. The igniter plug arrangement as claimed in claim 1, wherein an upper part of the floating sleeve above the first upper disk is of a divergent shape.

8. The igniter plug arrangement as claimed in claim 1, wherein the first upper disk of the floating sleeve is provided with orifices.

* * * * *